United States Patent
Taya et al.

(10) Patent No.: US 8,586,176 B2
(45) Date of Patent: Nov. 19, 2013

(54) SHAPE MEMORY ALLOY FIBERS AND SHAPE MEMORY POLYMER FIBERS AND FILMS AND THEIR COMPOSITES FOR REVERSIBLE SHAPE CHANGES

(75) Inventors: Minoro Taya, Mercer Island, WA (US); Yuanchang Liang, Seattle, WA (US)

(73) Assignee: University of Washington, Seattle, WA (US)

( * ) Notice: Subject to any disclaimer, the term of this patent is extended or adjusted under 35 U.S.C. 154(b) by 230 days.

(21) Appl. No.: 12/264,178

(22) Filed: Nov. 3, 2008

(65) Prior Publication Data
US 2009/0130391 A1    May 21, 2009

Related U.S. Application Data

(60) Provisional application No. 60/984,866, filed on Nov. 2, 2007, provisional application No. 60/985,390, filed on Nov. 5, 2007.

(51) Int. Cl.
*F01B 29/10* (2006.01)

(52) U.S. Cl.
USPC ............... 428/222; 428/371; 244/46; 244/49

(58) Field of Classification Search
USPC ..................................................... 428/172
See application file for complete search history.

(56) References Cited

U.S. PATENT DOCUMENTS

| | | | |
|---|---|---|---|
| 2,494,235 A | 1/1950 | Gierwiatowski | 250/40 |
| 3,096,449 A | 7/1963 | Stucki | 307/88.5 |
| 3,517,193 A | 6/1970 | Mook, Jr. et al. | 250/83.1 |
| 3,942,759 A | 3/1976 | Passera et al. | 251/129 |
| 3,965,753 A | 6/1976 | Browning, Jr. | 73/504 |
| 4,761,955 A | 8/1988 | Bloch | 60/528 |
| 4,945,727 A | 8/1990 | Whitehead et al. | 60/527 |

(Continued)

FOREIGN PATENT DOCUMENTS

| EP | 0 997 953 | 5/2000 |
|---|---|---|
| JP | 58-057573 | 4/1983 |

(Continued)

OTHER PUBLICATIONS

Gorman, Jessica. "Fracture Protection: Nanotubes toughen up ceramics." *Science News Online*, vol. 163, No. 1: 1-3, 2003.

(Continued)

*Primary Examiner* — Maria Veronica Ewald
*Assistant Examiner* — Laura Auer
(74) *Attorney, Agent, or Firm* — Christensen O'Connor Johnson Kindness PLLC

(57) ABSTRACT

A plurality of reversible active composite materials are disclosed, including composites based on a shape memory alloy member (SMA) and a shape memory polymer member (SMP), as well as composites based on two different SMP members. Each different member (SMA or SMP) will be trained to remember a specific shape at a specific temperature. Where two different SMP members are employed, the members exhibit different glass transition temperatures. Such composite materials can be implemented in many form factors, including two generally planar members, a single generally planar SMP member with SMA fibers distributed throughout the SMP, and a SMA fiber/wire coated with a SMP coating. In particular, the SMA fiber/wire coated with a SMP layer can be used to form helical coils that can be used in paired hinges to achieve reversible bending of a structure into which such paired hinges are incorporated.

7 Claims, 5 Drawing Sheets

(56) References Cited

U.S. PATENT DOCUMENTS

| | | | | |
|---|---|---|---|---|
| 5,071,064 | A | 12/1991 | AbuJudom et al. | 236/1 G |
| 5,080,205 | A | 1/1992 | Miller et al. | 188/299 |
| 5,086,618 | A | 2/1992 | Tanaka | 60/527 |
| 5,475,353 | A | 12/1995 | Roshen et al. | 335/78 |
| 5,687,958 | A | 11/1997 | Renz et al. | 267/136 |
| 5,750,272 | A | 5/1998 | Jardine | 428/686 |
| 6,065,934 | A | 5/2000 | Jacot et al. | 416/155 |
| 6,123,316 | A | 9/2000 | Biegelsen et al. | 251/129.01 |
| 6,242,841 | B1 | 6/2001 | Williams | 310/306 |
| 6,326,707 | B1 | 12/2001 | Gummin et al. | 310/12 |
| 6,343,849 | B1 | 2/2002 | Yun et al. | 347/20 |
| 6,427,712 | B1 | 8/2002 | Ashurst | 137/62 |
| 6,457,654 | B1 | 10/2002 | Glezer et al. | 239/4 |
| 6,499,952 | B1 | 12/2002 | Jacot et al. | 416/155 |
| 6,530,564 | B1 | 3/2003 | Julien | 267/147 |
| 6,563,933 | B1 | 5/2003 | Niederdraenk | 381/417 |
| 6,609,698 | B1 | 8/2003 | Parsons et al. | 251/129.17 |
| 6,633,095 | B1 | 10/2003 | Swope et al. | 310/12 |
| 6,654,316 | B1 | 11/2003 | Butler et al. | 367/163 |
| 6,705,323 | B1 | 3/2004 | Nikolchev et al. | 128/830 |
| 6,796,124 | B2 | 9/2004 | Kutlucinar | 60/528 |
| 6,803,846 | B2 | 10/2004 | Ohta et al. | 335/215 |
| 6,830,316 | B2 | 12/2004 | Silverbrook | 347/54 |
| 6,832,477 | B2 | 12/2004 | Gummin et al. | 60/527 |
| 7,025,323 | B2 | 4/2006 | Krulevitch et al. | 251/11 |
| 7,104,056 | B2 | 9/2006 | Taya et al. | 60/527 |
| 7,204,472 | B2 | 4/2007 | Jones et al. | 251/129.06 |
| 7,246,489 | B2 | 7/2007 | Du Plessis et al. | 60/528 |
| 7,371,295 | B2 | 5/2008 | Oikawa et al. | 148/402 |
| 2002/0142119 | A1 | 10/2002 | Seward et al. | 428/36.9 |
| 2004/0197519 | A1* | 10/2004 | Elzey et al. | 428/68 |
| 2005/0198907 | A1 | 9/2005 | McKnight et al. | 49/506 |
| 2005/0199455 | A1 | 9/2005 | Browne et al. | 188/266.4 |
| 2005/0263359 | A1 | 12/2005 | Mankame et al. | 188/266.1 |
| 2005/0275246 | A1 | 12/2005 | Browne et al. | 296/187.04 |
| 2006/0163431 | A1* | 7/2006 | Dittrich | 244/126 |
| 2006/0186700 | A1 | 8/2006 | Browne et al. | 296/187.01 |

FOREIGN PATENT DOCUMENTS

| | | |
|---|---|---|
| JP | 62-088890 | 4/1987 |
| JP | 63-169367 | 7/1988 |
| JP | 63-272314 | 11/1988 |
| JP | 7-525 | 1/1995 |
| JP | 2002-129273 | 5/2002 |
| JP | 2002-285269 | 10/2002 |

OTHER PUBLICATIONS

Heczko et al., "Giant Field-Induced Reversible Strain in Magnetic Shape Memory NiMnGa Alloy." *IEEE Transactions on Magnetics*, vol. 36, No. 5: 3266-3268, 2000.

Hodgson et al., "Shape Memory Alloys." *ASM Handbook*, vol. 2: 897-902, 1992.

Johnson, Todd., "A Concept for an Inexpensive Low Speed Rotary Actuator Utilizing Shape Memory Alloy Filaments." *FERMILAB-VLHCPUB-134*: 11 pp., 1998.

Kato et al., "Development of Ferromagnetic Shape Memory Alloys Based on FePd alloy and Its Applications." *Proceedings of the 50th Anniversary of Japan Society of Materials Science*, Osaka, Japan: 296-305, 2001.

Lagoudas, Dimitris., "Dynamic Behavior and Shock Absorption Properties of Porous Shape Memory Alloys." *Storming Media*, Report No. A577304: 3 pp., 2002.

Lagoudas et al., "Processing and Characterization of NiTi Porous SMA by Elevated Pressure Sintering." *Journal of Intelligent Material Systems and Structures*, vol. 13, No. 12: 837-850, 2002.

Lagoudas, Dimitris., "Pseudoelastic SMA Spring Elements for Passive Vibration Isolation: Part I—Modeling." *Storming Media*, Report No. A639824: 3 pp., 2004.

Liang et al., "Design of diaphram actuator based on ferromagnetic shape memory alloy composite." *Smart Structures and Materials 2003*, Proc. of SPIE, vol. 5054: 45-52, 2003.

Liang et al., "Design of membrane actuators based on ferromagnetic shape memory allow composite for the synthetic jet actuator." *Smart Structures and Materials 2004*, Proc. of SPIE: vol. 5390: 268-275, 2004.

Matsunaga et al., "Design of ferromagnetic shape memory alloy composites based on TiNi for robust and fast actuators." *Proc. SPIE on Smart Materials*, vol. 4699, No. 172: 10 pp., 2002.

Song et al., "Fabrication of closed cellular nickel alloy containing polymer by sintering method." *Journal of Alloys and Compounds*: vol. 355: 166-170, 2003.

Suorsa et al., "Applications of Magnetic Shape Memory Actuators" *Actuator 2002*: 6 pp., 2002.

Suorsa et al., "Magnetic shape memory actuator performance" *Journal of Magnetism and Magnetic Materials*, vol. 272-276: 2029-2030, 2004.

Suorsa, Ilkka., "Performance and Modeling of Magnetic Shape Memory Actuators and Sensors." *TKK Dissertations 4—Department of Electrical and Communications Engineering Laboratory of Electromechanics*, Helsinki University of Technology: 72 pp., 2005.

Tellinen et al., "Basic Properties of Magnetic Shape Memory Actuators." *Actuator 2002*: 4 pp., 2002.

Ullakko et al., "Large magnetic-field-induced strains in $Ni_2MnGa$ single crystals." *Appl. Phys. Lett.*, vol. 69, No. 13: 1966-1968, 1996.

Ullakko, K.. "Magnetically Controlled Shape Memory Alloys: A New Class of Actuator Materials." *Journal of Materials Engineering and Performance*, vol. 5, No. 3: 405-409, 1996.

Wada et al., "Design of spring actuators made of ferromagnetic shape memory alloy and composites." *Smart Structures and Materials 2003*, Proceedings of SPIE, vol. 5054: 125-134, 2003.

Wada et al., "Spring-based actuators." *Proceedings of SPIE*, vol. 4699: 294-302, 2002.

Wu et al., "Dynamics of Synthetic Jet Actuator Arrays for Flow Control." *American Institute of Aeronautics and Astronautics*: 8 pp., 2003.

Ye et al., "Consolidation of MA amorphous NiTi powders by spark plasma sintering." *Materials Science and Engineering*, A241: 290-293, 1998.

"Fine Particle Industry Review, 1998." *Business Communications Co.*: 5 pp., 1999.

* cited by examiner

Design of reversible shape memory polymer(SMP) based on two different SMPs with different Tg

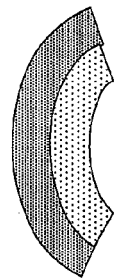 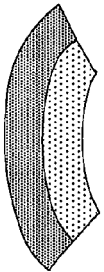 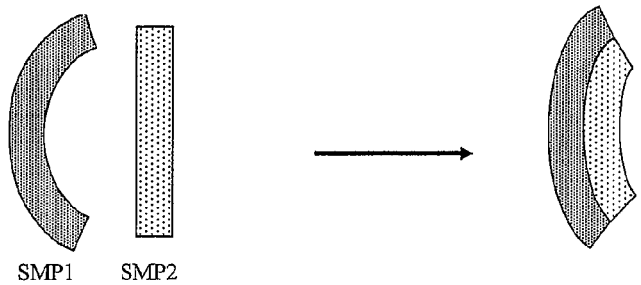

SMP1   SMP2

Two kinds of SMPs are prepared. SMP1 and SMP2 have $T_g$ at $T^1_g > T^2_g$.

SMP1 memorizes the highly curved shape. SMP2 memorizes the straight shape.

These SMPs are attached forcibley as illustrated above at $T_i < T^1_g$, $T^2_g$. This compsite is less curved than SMP1 but more curved than SMP2 due to the tendency of SMP1 getting back to the curved shape and the tendency of SMP2 getting back to the straight shape.

STEP 1                                 STEP 2

Once the temperature is raised above $T^2_g$ but lower than $T^1_g$, SMP2 part of the composite softens, and SMP1 part tends to bend more. Consequently, the composite comes to bend more than STEP 2.

Once the temperature is raised above $T^1_g$, SMP1 part softens, and SMP2 part tends to get back to the initial straight shape. Consequently, the composite comes to be straightened more than STEP 3. Hopefully the composite shape is same as that of STEP 2. Cooling the composite down to $T_i$ realizes the same state as STEP 2.

STEP 3                                 STEP 4

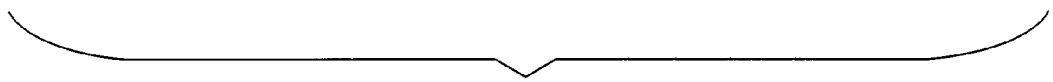

FIG. 11

SHAPE MEMORY ALLOY FIBERS AND SHAPE MEMORY POLYMER FIBERS AND FILMS AND THEIR COMPOSITES FOR REVERSIBLE SHAPE CHANGES

RELATED APPLICATIONS

This application is based on two prior provisional applications, Ser. No. 60/984,866, filed on Nov. 2, 2007, and Ser. No. 60/985,390, filed on Nov. 5, 2007, the benefits of the filing dates of which are hereby claimed under 35 U.S.C. §119(e).

GOVERNMENT RIGHTS

This invention was made with government support under grant number FA9550-05-1-0196 awarded by the Air force Office of Scientific Research. The government has certain rights in the invention.

BACKGROUND

Actuators are relatively simple mechanical components that are often incorporated into more complex mechanical systems, including those found in automobiles, aircraft, manufacturing facilities, and processing facilities. A conventional solenoid is one example of an actuator that has found broad application across many types of industries and technologies.

With respect to aerospace structures in particular, morphing aerospace structures can be achieved using several approaches: by using fixed shape components and actuators which will move those fixed shaped components; by using variable shape materials (i.e., morphing materials); and by using combinations thereof. It would be desirable to provide morphing materials capable of accommodating relatively large deformations while also exhibiting relatively high mechanical strengths, for use in aerospace structures and other applications.

Electroactive polymers, shape memory alloys (SMA), and shape memory polymers (SMP) exhibit such desirable properties. Electroactive polymers generally require a relatively bulky power unit. SMAs and SMPs can change shape in response to temperature changes. Performance of such active materials can be evaluated in terms of specific active strain, which is the maximum strain divided by the weight of the active material and required infrastructure (i.e., any power supply required, or means for controlling temperature). Both SMAs and SMPs can provide relatively high specific active strain.

Aerospace structures (whether implemented using fixed shape materials or morphing materials) often require a reversible change between two configurations. Unfortunately, SMAs and SMPs generally exhibit a one-way shape memory property, which is not ideal for reversible morphing structures. It would be desirable to enable techniques for using one-way SMAs and SMPs in structures requiring a reversible change between two configurations. Such structures will likely find application in aerospace and medical industries.

SUMMARY

This application specifically incorporates by reference the disclosures and drawings of each patent application and issued patent identified above as a related application.

The concepts disclosed herein encompass reversible active materials based on SMAs and SMPs. Such a composite reversible active material will include a SMP member and a SMA member. The SMP member will be configured to return (i.e., to remember) to a specific shape at a first temperature. The SMA member will be configured to return (i.e., to remember) to a specific shape at a second temperature. In at least one embodiment, the first temperature is less than the second temperature.

A related embodiment employed no SMA, but rather a first SMP member and a second SMP member, where the different SMP members exhibit different glass transition temperatures.

Such composite materials can be implemented in many form factors, including two generally planar members (including configurations where one or more of the generally planar members is trained to achieve a bent configuration), a single generally planar SMP member with SMA fibers distributed throughout the SMP, and a SMA fiber/wire coated with a SMP coating. In particular, the SMA fiber/wire coated with a SMP layer can be used to form helical coils that can be used in paired hinges to achieve reversible bending of a structure into which such paired hinges are incorporated.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 1:
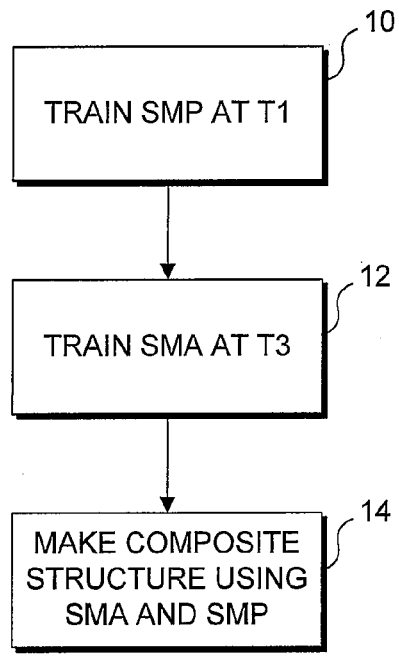
FIG. 1 is a block diagram illustrating an exemplary method for achieving a composite reversible active material including a SMP member and a SMA member.
Figure 2:
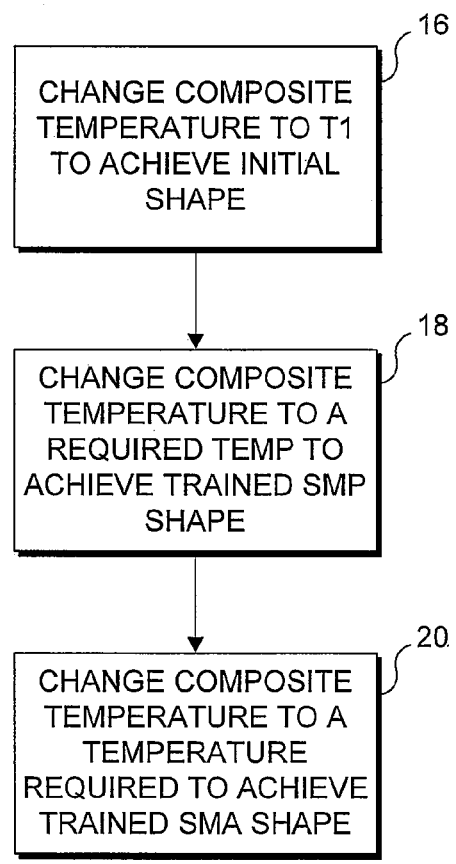
FIG. 2 is a block diagram illustrating an exemplary method for using a composite reversible active material including a SMP member and a SMA member.
Figure 3:
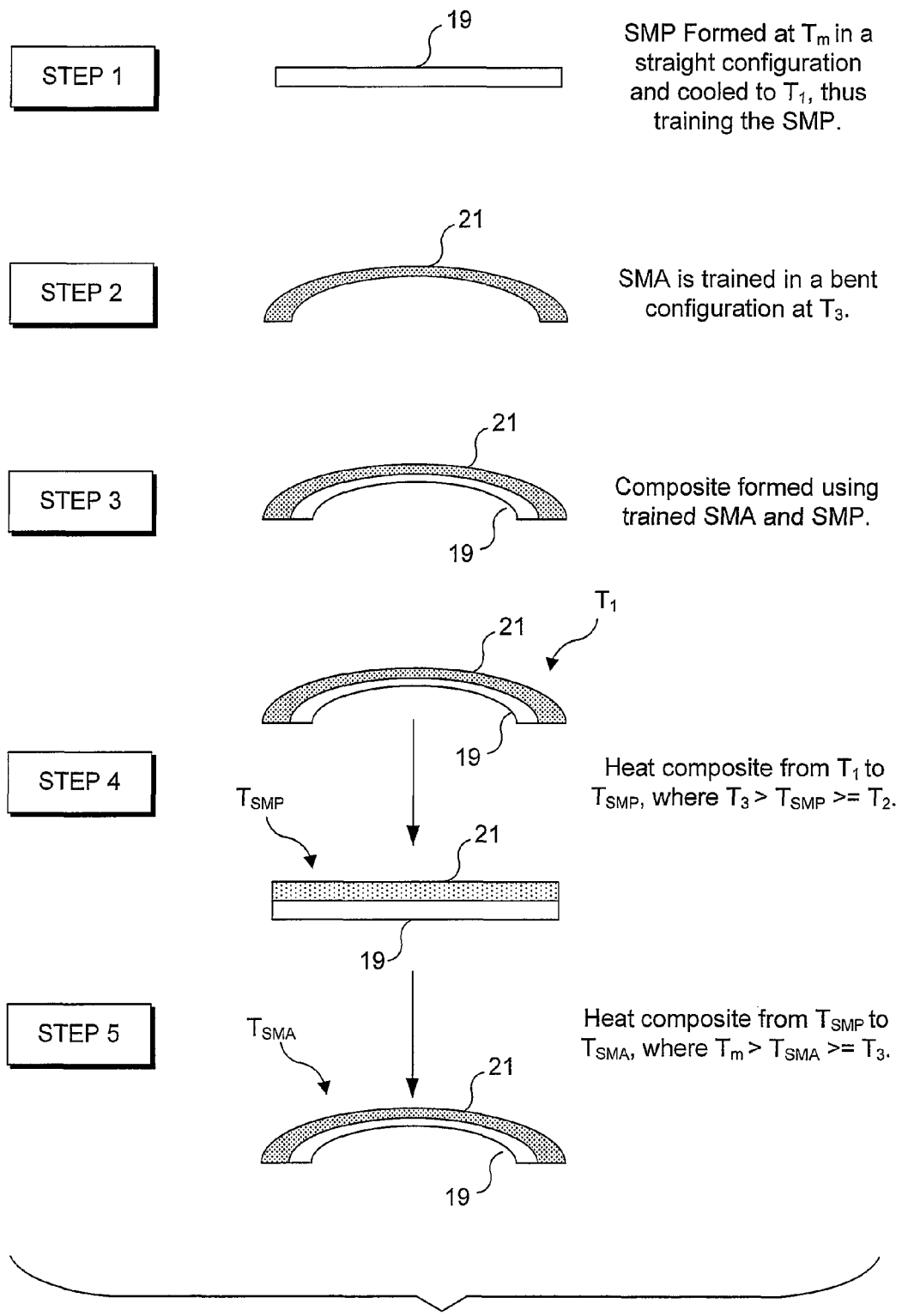
Figure 4:
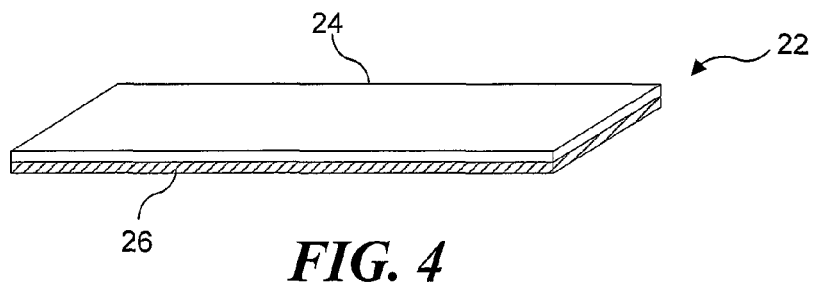
Figure 5:
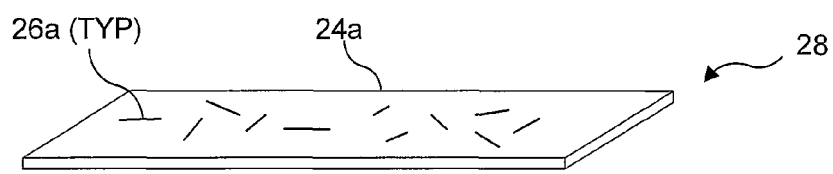
Figure 6:
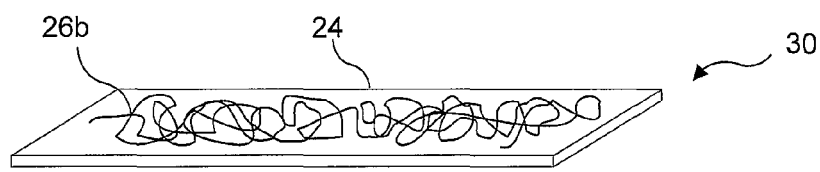
Figure 7:
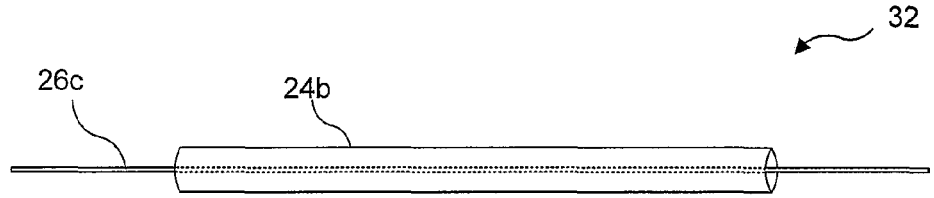
Figure 8:
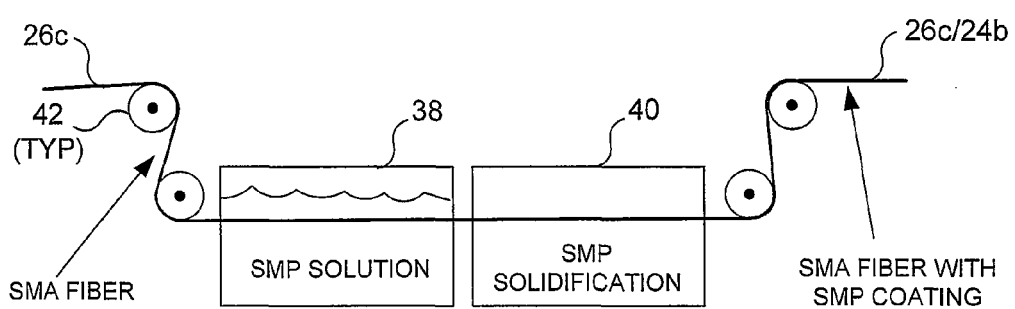
Figure 9:
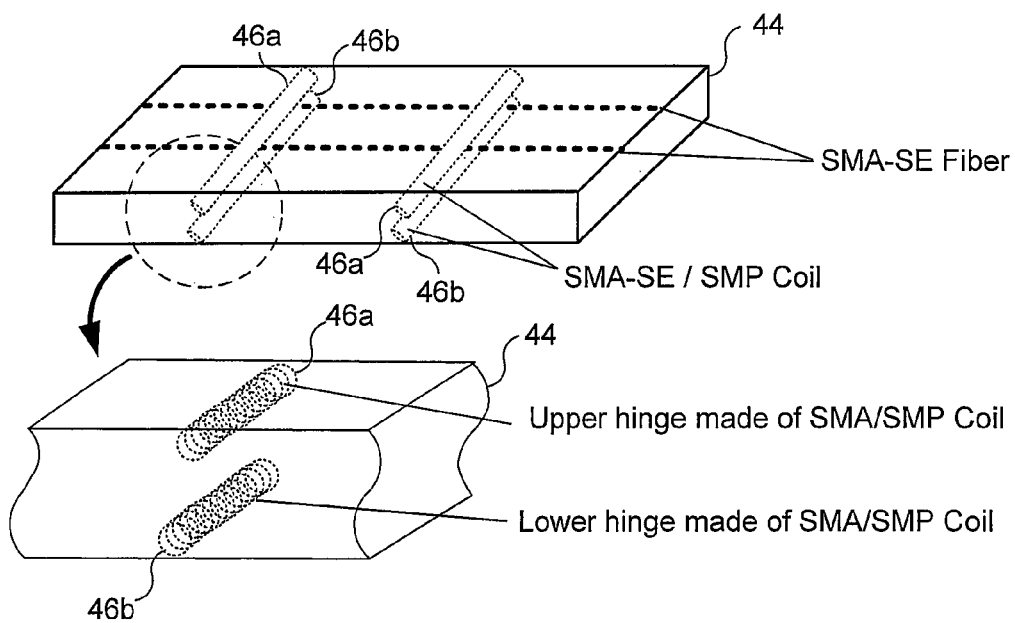
Figure 10A:
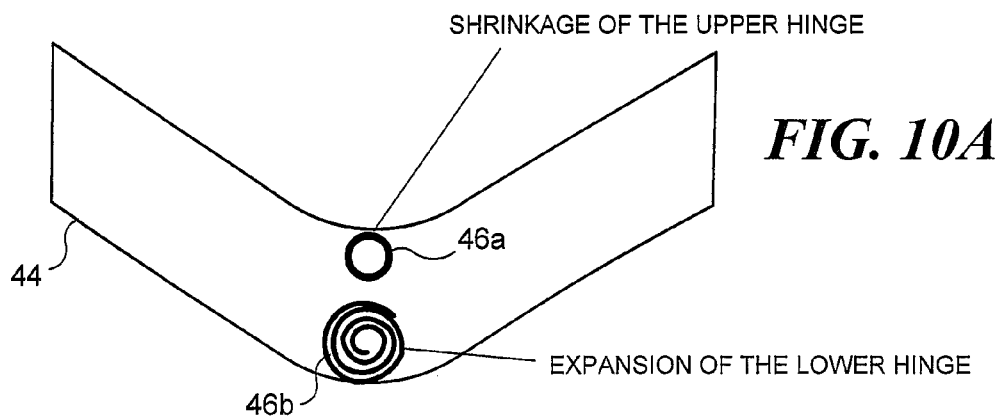
Figure 10B:
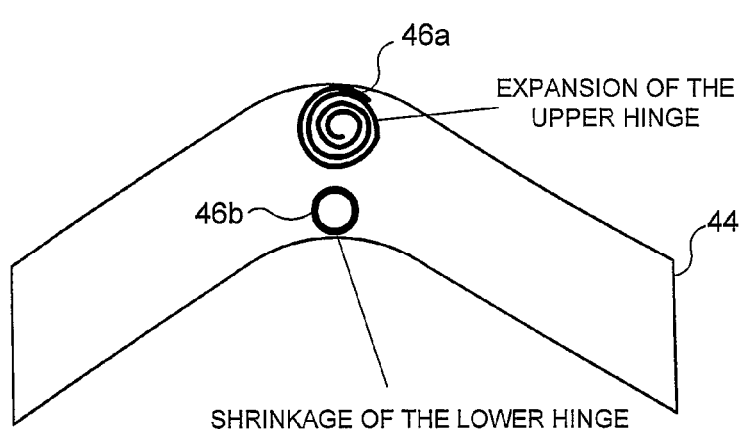

FIG. 3 schematically illustrates the methods of FIGS. 1 and 2;

FIG. 4 schematically illustrates a composite reversible active material including a generally planar SMP member and a generally planar SMA member;

FIG. 5 schematically illustrates a composite reversible active material including a generally planar SMP member and a plurality of SMA member fibers;

FIG. 6 schematically illustrates a composite reversible active material including a generally planar SMP member and a SMA member implemented using a fibrous mat;

FIG. 7 schematically illustrates a composite reversible active material including a SMA fiber coated with a SMP;

FIG. 8 schematically illustrates an exemplary method for making the composite reversible active material of FIG. 7;

FIG. 9 schematically illustrates a structure including a hinge implemented using a composite reversible active material including a SMP member and a SMA member;

FIGS. 10A and 10B schematically illustrate the operation of the hinge of FIG. 9; and FIG. 11 schematically illustrates an exemplary method for achieving a composite reversible active material including a first SMP member and a second SMP member, where different SMPs are employed.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

FIG. 1 is a block diagram illustrating an exemplary method for achieving a composite reversible active material including a SMP member and a SMA member. In a block 10, the SMP member is trained to remember a specific configuration or shape at a first temperature $T_1$. In at least one embodiment the SMP (at $T_m$) is formed into a straight configuration and allowed to cool to $T_1$. In a block 12, the SMA member is trained to remember a specific configuration or shape at a temperature $T_3$, where $T_3$ generally corresponds to the austenite finishing temperature of the SMA. In at least one embodiment, the SMA is trained to achieve a bent configuration. In a block 14, the trained SMA and SMP members are combined together to form the composite reversible active material. It should be recognized that the specific configurations the SMA and SMP are trained to remember are intended to be exemplary, rather than limiting.

In such a method, $T_1 < T_2 < T_3 < T_m$ (melting temperature of the SMP), where $T_2 = T_g$ of the SMP. Those of ordinary skill in the art will recognize that $T_g$ is the glass transition temperature of a non-crystalline material (i.e., the critical temperature at which the material changes its behavior from being hard and brittle (and therefore relatively easy to break) to being elastic and flexible). For example, at room temperature, striking a piece of glass with a hammer will shatter the glass, while striking a piece of rubber will not shatter the rubber, as the rubber would simply absorb the energy by momentarily deforming or stretching. However, if the same piece of rubber is submerged in liquid nitrogen, the cold rubber will shatter just like glass at room temperature, because the cold rubber is below its glass transition temperature.

FIG. 2 is a block diagram illustrating an exemplary method for using a composite reversible active material including a SMP member and a SMA member. In a block 16 temperature conditions are manipulated such that the composite achieves temperature $T_1$ and an initial shape. In a block 18 the temperature conditions are manipulated such that a temperature required for the composite to morph into the trained SMP shape (i.e., $T_{SMP}$) is achieved. The temperature $T_{SMP}$ is less than $T_3$ but greater than or equal to the $T_g$ of the SMP (i.e., $T_3 > T_{SMP} >= T_2$). In a block 20 the temperature conditions are manipulated such that a temperature required for the composite to morph into the trained SMA shape (i.e., $T_{SMA}$) is achieved. The temperature $T_{SMA}$ is less than $T_m$ of the SMP but greater than or equal to the $T_3$ of the SMA (i.e., $T_m > T_{SMA} >= T_3$).

FIG. 3 schematically illustrates the methods of FIGS. 1 and 2, showing the composite material including SMP member 19 and SMA member 21 being formed into a composite structure that reversibly transitions (or morphs) between two configurations.

FIG. 4 schematically illustrates a composite reversible active material 22 including a generally planar SMP member 24 and a generally planar SMA member 26.

FIG. 5 schematically illustrates a composite reversible active material 28 including generally planar SMP member 24a and a plurality of SMA member fibers 26a. The SMA fibers are added to the SMP when the SMP is in a molten state, and the SMP is then molded into the desired shape.

FIG. 6 schematically illustrates a composite reversible active material 30 including a generally planar SMP member 24 and a SMA member implemented using a fibrous mat 26b.

FIG. 7 schematically illustrates a composite reversible active material 32 including a SMA fiber 26c coated with a SMP layer 24b. FIG. 8 schematically illustrates an exemplary method for making the composite reversible active material of FIG. 7. SMA fiber 26c is introduced into a container 38 including a SMP solution. The SMA fiber coated with the SMP solution is then introduced into a volume 40 configured to solidify the SMP coating on the SMA fiber. For example, container 38 could contain molten SMP and volume 40 could be cooled to a temperature below $T_m$ of the SMP, so that the SMP coating on the SMA solidifies. Alternatively, container 38 could include SMP dissolved in a solvent, and volume 40 could be heated to a temperature selected to volatilize the solvent, leaving behind the SMP coating on the SMA. A system of rollers 42 can be used to control a motion of the SMA fiber. It should be recognized that such a method is intended to be exemplary, rather than limiting.

FIG. 9 schematically illustrates a structure 44 (i.e., a plate) including a plurality of hinges implemented using a composite reversible active material including both a SMP member and a SMA member. The hinges are employed in pairs, including an upper hinge 46a and a lower hinge 46b.

Each hinge is formed using a composite coil substantially corresponding to the composite material of FIG. 7 (i.e., a SMA fiber or wire coated with a SMP, each of which is shape trained as discussed above in connection with FIG. 1). A generally helical coil is formed using the composite material FIG. 7 for each upper and lower hinge.

FIGS. 10A and 10B schematically illustrate the operation of the hinge of FIG. 9, which enables reversible bending of structure 44 to be achieved. In FIG. 10A, the temperature of upper spring is controlled so that the coil spring remains in a first compact configuration, while the temperature of lower spring is controlled so that the coil spring of the lower hinge morphs to a second expanded configuration. In FIG. 10B, the temperature of upper spring is controlled so that the coil spring hinge morphs to the second expanded configuration, while the temperature of lower spring is controlled so that the coil spring of the lower hinge remains in a first compact configuration.

Manipulating the temperature of the upper and lower springs enables reversible bending of the plate structure. While such a plate structure is likely to be usable in many types of actuators, it should be recognized that such paired hinges can be employed in other types of structures to enable reversible shape changes, and the plate structure of FIGS. 9, 10A and 10B is intended to be exemplary, and not limiting.

Temperature control of the hinges can be implemented by passing a current through the SMA portion of the composite coil spring, thereby heating the hinge. When the current is removed, the hinge will be cooled to a lower temperature by the ambient environment. If faster switching times are required, cooling can be implemented using the thermoelectric effect, also referred to as the Peltier-Seebeck effect.

FIG. 11 schematically illustrates an exemplary method for achieving a composite reversible active material including a first SMP member and a second SMP member, where different SMPs are employed. The SMP each have a different $T_g$.

In Step 1, two different SMPs are prepared, generally as discussed above. $SMP_1$ will have a larger $T_g$ than $SMP_2$. $SMP_1$ is trained to remember a curved or bent configuration, while $SMP_2$ is trained to remember a flat or straight configuration.

In Step 2, a composite is formed using $SMP_1$ and $SMP_2$, at a temperature $T_i$ (where $T_i < T_g$ of $SMP_1$). The different SMPs are forced together, such that the $SMP_2$ is partially bent (i.e., the composite will be partially curved, but to a lesser extent than $SMP_1$).

In Step 3, the composite is heated to a temperature $T_1$, where $T_g$ of $SMP_1 < T_1 < T_g$ of $SMP_2$. This causes the $SMP_2$ portion of the composite to soften, and the composite becomes bent to a greater degree (i.e., the $SMP_1$ portion of the composite moves closer to its original bent configuration).

In Step 4, the composite is heated to a temperature $T_2$, where $T_2 > T_g$ of $SMP_1$ (which is $> T_g$ of $SMP_2$). This causes the $SMP_1$ portion of the composite to soften, and the composite becomes bent to a lesser degree (i.e., the $SMP_2$ portion of the composite moves closer to its original straight configuration). The composite is then cooled to $T_1$, and the composite remains in the configuration of Step 2.

Heating and cooling of the composite can be achieved generally as discussed above. It should be recognized that the disclosed heating and cooling techniques are intended to be exemplary, rather than limiting, and other heating and cooling techniques known in the art can also be employed.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right claimed is defined by the following:

1. A structure that reversibly changes from a first configuration to a second configuration using paired composite hinges, the structure comprising:
    (a) an upper face and a lower face;
    (b) an upper hinge disposed adjacent the upper face; and
    (c) a lower hinge disposed adjacent the lower face, the lower hinge being spaced apart from the upper hinge and being aligned with the upper hinge, each hinge comprising a SMA core and a SMP outer layer, where the SMA core has been trained to remember a first shape at a first temperature, and the SMP outer layer has been trained to remember a second shape at a second temperature, the first and second temperatures being different;

wherein the upper hinge is a coil centered on a first axis and the lower hinge is a coil centered on a second axis, wherein the first axis and the second axis are parallel.

2. The structure of claim 1, wherein each hinge is configured such that the hinge is relatively larger at a temperature $T_{Ex}$, and relatively smaller at a temperature $T_{con}$.

3. The structure of claim 2, wherein the structure comprises a plate, and the lower face achieves a convex configuration when the lower hinge is relatively larger than the upper hinge.

4. The structure of claim 2, wherein the structure comprises a plate, and the lower face achieves a concave configuration when the lower hinge is relatively smaller than the upper hinge.

5. The structure of claim 1, wherein a common axis aligning the upper hinge to the lower hinge is perpendicular to a portion of the upper face overlying the upper hinge and a portion of the lower face overlying the lower hinge.

6. The structure of claim 1, wherein the first hinge and the second hinge are independently configured to be heated resistively by passing a current through the SMA core.

7. The structure of claim 6, wherein the SMA core of each of the first hinge and the second hinge extends longitudinally beyond the SMP outer layer so as to provide electrical contacts for resistive heating.

* * * * *